(No Model.)
P. P. SCHAU.
THILL COUPLING.
No. 362,186. Patented May 3, 1887.
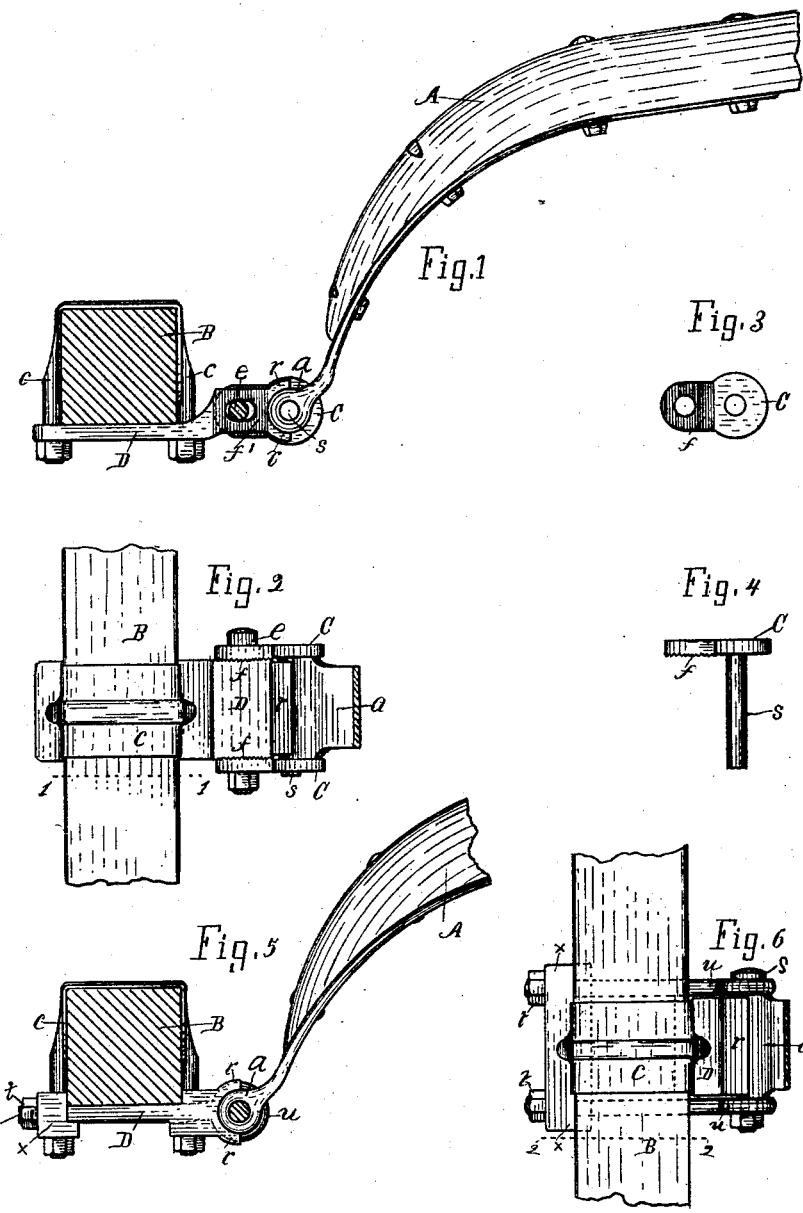
Witnesses.
John C Perkins
Henry E M Howard
Inventor.
Phillip P Schau
By Luemis C West
atty

UNITED STATES PATENT OFFICE.

PHILLIP P. SCHAU, OF COOPER, MICHIGAN.

THILL-COUPLING.

SPECIFICATION forming part of Letters Patent No. 362,186, dated May 3, 1887.

Application filed October 18, 1886. Serial No. 216,503. (No model.)

*To all whom it may concern:*

Be it known that I, PHILLIP P. SCHAU, a citizen of the United States, residing at Cooper, county of Kalamazoo, State of Michigan, have invented a new and useful Thill-Coupling, of which the following is a specification.

This invention has for its object an improved coupling, substantially as below described and claimed, whereby the thill-eye is adjusted in a concave seat by a horizontal backward or forward movement of the eyebolt.

In the drawings forming a part of this specification, Figure 1 is a side elevation showing the vehicle-axle in cross-section on line 1 1 in Fig. 2, and with the side plate below described removed; Fig. 2, a plan of Fig. 1; Fig. 3, a plan of the side plate which bears the clip-eye; Fig. 4, a top view of one of the side plates and the eyebolt; Fig. 5, a section on line 2 2 in Fig. 6, and Fig. 6 is a plan of Fig. 5.

Referring to the lettered parts in the drawings, A is the thill; $a$, the thill-eye; B, the axle of a vehicle, and $c$ the clip, which secures the plate D, usually bearing the clip-eye, to the axle. The forward portion of the plate D (here shown) has a concave seat adapted to receive the thill-eye $a$, said seat $r$ $r$ being open at the front to receive the thill-eye $a$.

Back of the seat $r$ $r$ in Figs. 1 and 2 the plate D is provided with an elongated hole, in which the bolt $e$ is placed. At each end of this hole, on the edges of the plate D, are serrations $f'$. The side plates, C, or adjustable draw-straps, properly, have a serrated portion, $f$, Figs. 2 and 3, engaging the serrations $f'$ of the plate D. The forward end of the plate C has an eye to receive the eyebolt $s$ when coupling the thill, and the rear end has a hole, through which the adjusting-bolt $e$ passes, thus attaching the plates or straps C to the plate D. By loosening the nut of the bolt $e$ the straps C can be moved back, causing the eyebolt to be carried back, and by this means causing the eye $a$ to fit closer in the seat $r$ $r$. By tightening the bolt $e$ again the serrated parts $f'$ $f$ engage each other and hold the plates C from displacement when subjected to the draft-strain in drawing the vehicle. By thus adjusting the thill-eye to take up the wear of said eye and of its seat the bearing is kept uniform and close, and a successful anti-rattling coupling is the result, made durable and simple. There are several ways by which the eyebolt may be carried back in its horizontal position parallel with the axle to adjust the bearings of the thill-eye in its seat.

In Figs. 5 and 6 is shown a plan equivalent, so far as the adjusting is concerned, but for some reasons preferable, to that shown in Figs. 1, 2, and 3.

The rear end of the plate D in Figs. 5 and 6 has lateral projections $x$ $x$. The draw-rods $u$ take the eyebolt $s$ at the forward end and pass through holes in the projections $x$ $x$ at the rear end, where they are provided with tightening or adjusting nuts $t$. In Fig. 5 one of the rods $u$ (an equivalent to the plate C, Fig. 3) is removed and the eyebolt is in cross-section, as in Fig. 1.

By tightening the nuts $t$ the eyebolt $s$ is carried back, causing a close seating of the thill-eye $a$ in the seat $r$. One of the rods $u$ may be integral with the eyebolt $s$, the same as the integral bolt $s$ and plate C in Fig. 4. By means of this coupling all packings back of the thill-eye or springs to press against the thill-eye to prevent rattling are dispensed with.

Having thus described by invention, what I claim is—

1. In a thill or pole coupling, the combination of the concave seat, the thill-eye, the eyebolt, and means for adjustably attaching the eyebolt with the vehicle-axle, whereby the eyebolt may be carried back in its horizontal position parallel with the axle to closely seat the thill-eye in its seat, substantially as set forth.

2. In a thill and pole coupling, the plate having the lateral projection at the rear end on each side, said projections having holes to receive the rear end of the draw-rods, the plates at the forward end being provided with the upwardly and downwardly curved branches, forming a concave seat to receive the thill-eye, said plate secured to the axle between the seat and projections, and the draw-rods provided at the forward end with eyes to receive the eyebolt, all combined substantially as set forth.

In testimony of the foregoing I have hereunto subscribed my name in presence of two witnesses.

PHILLIP P. SCHAU.

Witnesses:
WM. E. HILL,
WM. TUTTLE.